United States Patent [19]

Placek

[11] Patent Number: 5,307,802
[45] Date of Patent: May 3, 1994

[54] HIGH EFFICIENCY STEAM GENERATOR

[76] Inventor: Edward A. Placek, 1769 Warren Rd., Vienna, Ohio 44473

[21] Appl. No.: 119,660

[22] Filed: Sep. 13, 1993

[51] Int. Cl.$^5$ .............................................. F24J 2/44
[52] U.S. Cl. ................................. 126/600; 126/641; 126/698; 126/609; 110/216; 122/32; 122/34
[58] Field of Search ............... 126/698, 641, 600, 609; 110/216; 122/32, 34

[56] References Cited

U.S. PATENT DOCUMENTS

| | | |
|---|---|---|
| 3,097,630 | 7/1963 | Kinyon . |
| 3,545,412 | 12/1970 | Kinyon . |
| 3,812,825 | 5/1974 | Polcer et al. . |
| 3,888,212 | 6/1975 | Wolowodiuk . |
| 4,357,908 | 11/1982 | Yazidjian . |
| 4,489,788 | 12/1984 | Shamarokov et al. . |
| 5,123,247 | 6/1992 | Nelson ................................ 126/698 |
| 5,191,875 | 3/1993 | Edling et al. ........................ 126/609 |
| 5,245,984 | 9/1993 | Longmore et al. ................. 126/641 |

Primary Examiner—Henry C. Yuen
Attorney, Agent, or Firm—Harpman & Harpman

[57] ABSTRACT

A steam generator having two vaporization chambers filled with molten metal salts for sequential flash evaporation of preheated atomized water through multiple vaporization tubes in said respective chambers. The molten metal salts are heated by secondary solar thermal input from lens assemblies and primary heat input from U-shaped hot air heating tubes within said vaporization chambers supplied by gas- fired tube burners. Steam vapor generated by initial vaporization chamber is re-circulated to the secondary chamber outputting super heated steam. The molten metal vaporization chambers are encased in a single pressure vessel with re-circulation of condensate and multiple heat exchangers within.

12 Claims, 6 Drawing Sheets 5,307,802

HIGH EFFICIENCY STEAM GENERATOR

BACKGROUND OF THE INVENTION

1. Technical Field

This device relates to steam generators that are used to generate super healed steam for the production of electricity and the like. Conventional steam generators as found in nuclear installations, for example, utilize an outer pressure vessel with tubular pipes inside defining intake and discharge of a primary heat transfer fluid.

2. Description of Prior Art

Prior art devices of this type have relied on a variety of different design configurations using tube heat exchangers through which flow molten metal salts within a pressure vessel. Water supplied within the vessel chamber is heated and vaporized with output passage steam through a vertically positioned output. Other general configurations use multiple inner chambers to isolate and direct water flow around and about tubular bundles through which high temperature heat transfer material is circulated from a variety of heat sources, see for example U.S. Pat. Nos. 3,097,630, 3,545,412, 3,888,212, 3,812,825, 4,375,908 and U.S. Pat. No. 4,489,788.

In U.S. Pat. Nos. 3,097,630 and 3,545,412 steam generators are shown wherein molten metal salts are circulated through tube bundles within a pressure chamber generating saturated and super heated steam.

U.S. Pat. Nos. 3,888,212 and 3,812,825 use circulation of a heating material (liquid metal sodium) over multiple tubular bundles and coils through which water is supplied within a pressure vessel.

In U.S. Pat. No. 4,375,908 U-tubes are positioned within a vessel divided by vertical separation into cold lines and hot lines respectively. A heating medium is circulated about the U-tube bundles extending from the cold line to the hot line through which water to be vaporized is pumped.

U.S. Pat. No. 4,489,788 defines a steam generator wherein a tube bundle within a pressure vessel is supplied with a heat carrier. Water is circulated about the bundle with the generated steam passing through multiple centrifuge separators to an outlet at the top of the vessel.

SUMMARY OF THE INVENTION

A steam generator utilizing separate static chambers of molten metal salt heated by internal gas fired heating tubes or external solar lens tubes. Multiple vaporization tubes extend through respective non-circulating molten metal salt chambers for the two-stage vaporization comprised of initial stage of atomized preheated water and a second stage wherein steam generated by the first stage is super heated, producing super heated steam.

DESCRIPTION OF THE PREFERRED EMBODIMENT

Figure 1:
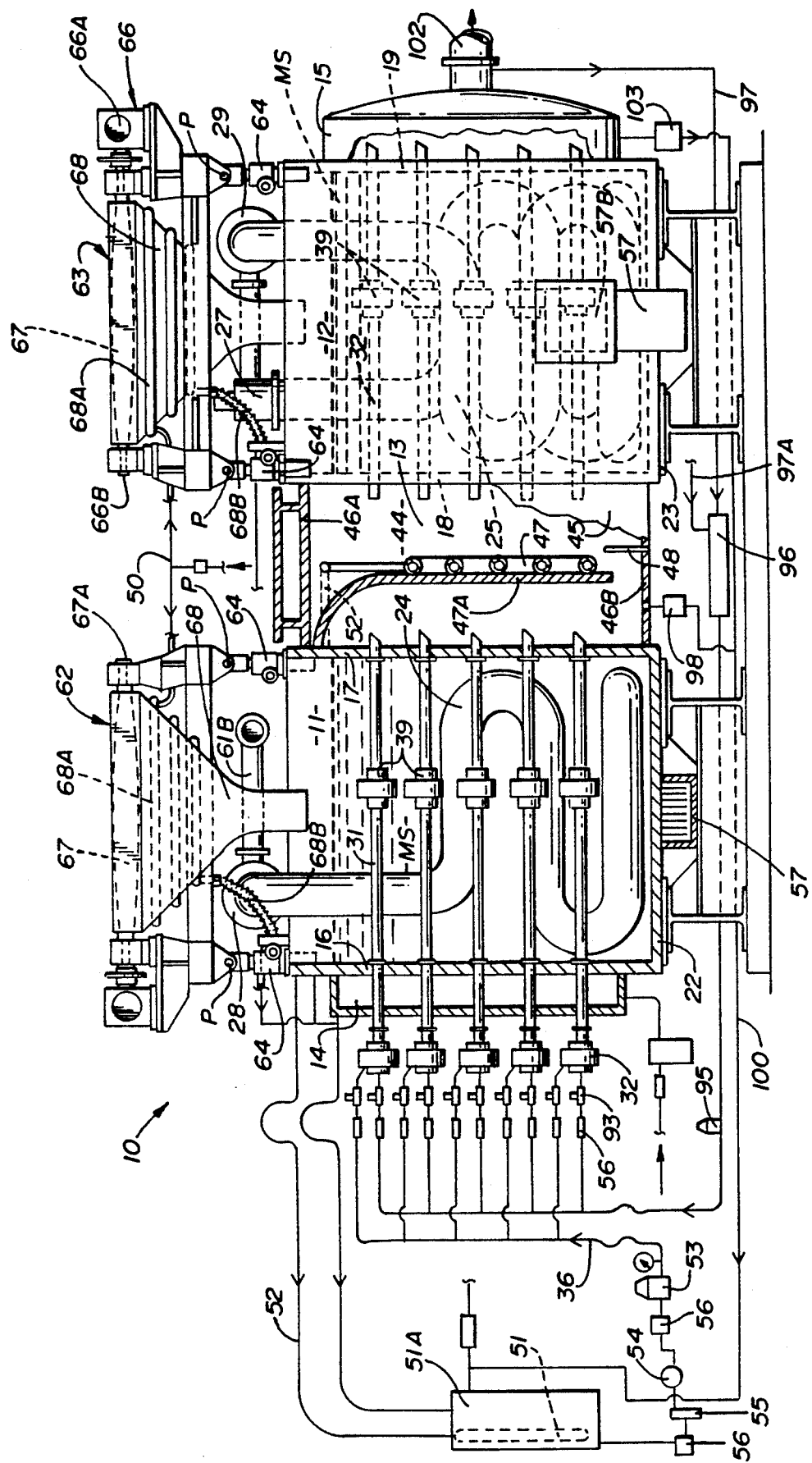
FIG. 1 is a sectional elevation of a steam generator embodying my invention.

Referring to FIGS. 1-4 of the drawings, a steam generator 10 can be seen. The steam generator 10 is comprised of a pair of vaporization chambers 11 and 12 with an inner connecting steam transfer chamber 13 therebetween. Each of said vaporization chambers 11 and 12 have a respective end caps 14 and 15 with respective apertured sidewalls 16 and 17, 18 and 19 and integral bottoms 22 and 23 respectively. Each of said vaporization chambers 11 and 12 have continuous multiple U-shaped heating tube assemblies 24 and 25 therein. The heating tube assemblies has burner assemblies 26 and 27 in one end and a vent stack outlet 28 and 29 at the other allowing for the products of combustion to vent therefrom. The respective venting stacks 28 and 29 are interconnected to a power vent 30 and scrubbing assembly 30A, best seen in FIGS. 2, 3, and 10 of the drawings which will be discussed in greater detail hereinafter.

Figure 2:
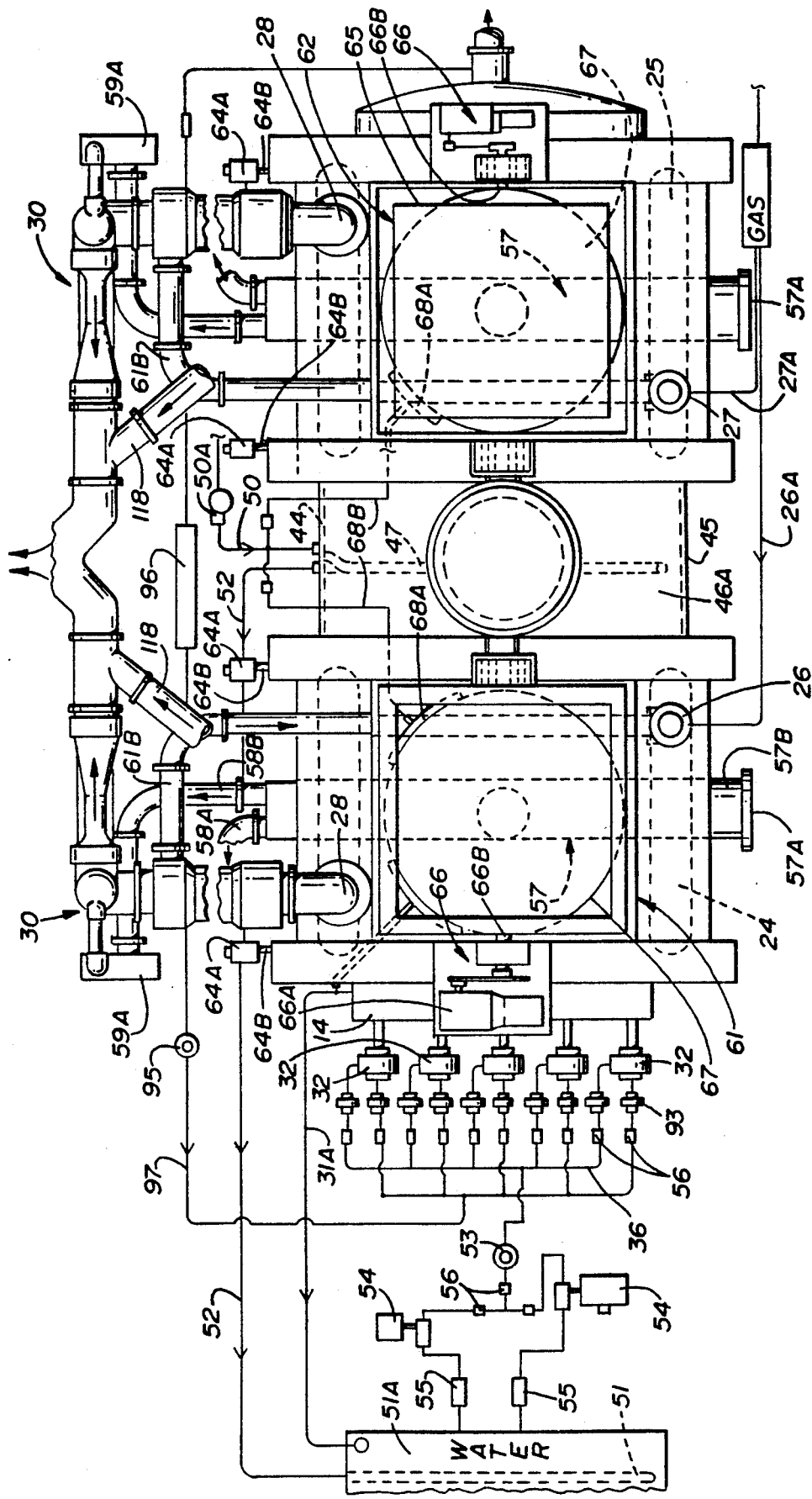
FIG. 2 is a top plan view of the steam generator illustrated in FIG. 1.
Figures 6, 7:
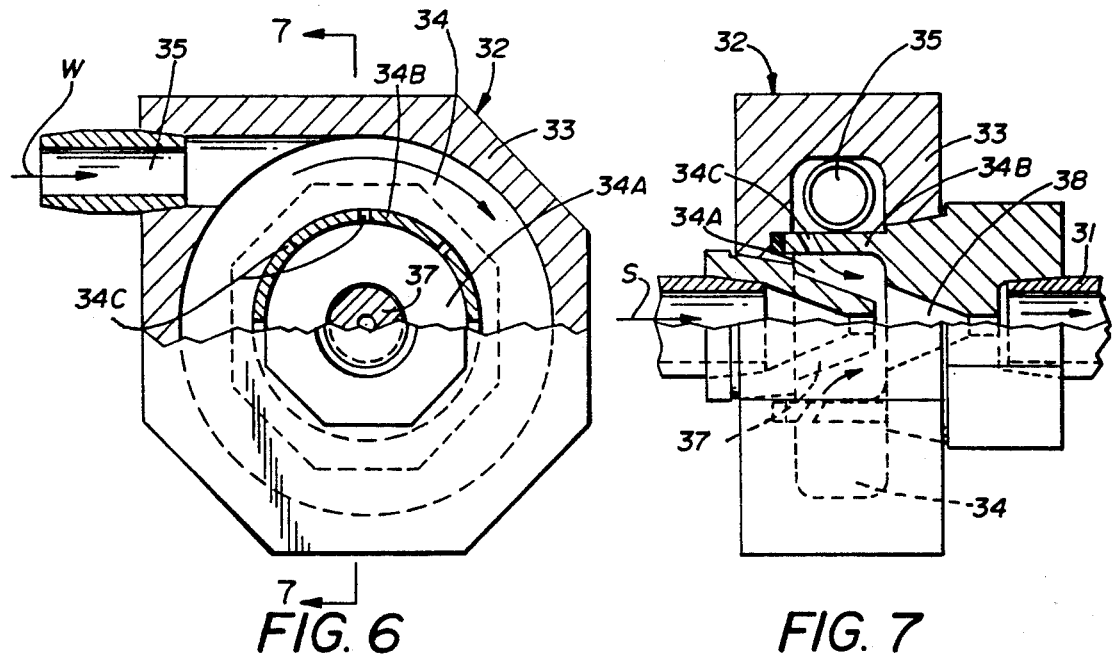
FIG. 6 is an enlarged partial cross-sectional view of a water inlet nozzle fitting.
FIG. 7 is an enlarged partial cross-sectional view on lines 7—7 of FIG. 6.
Figure 8:
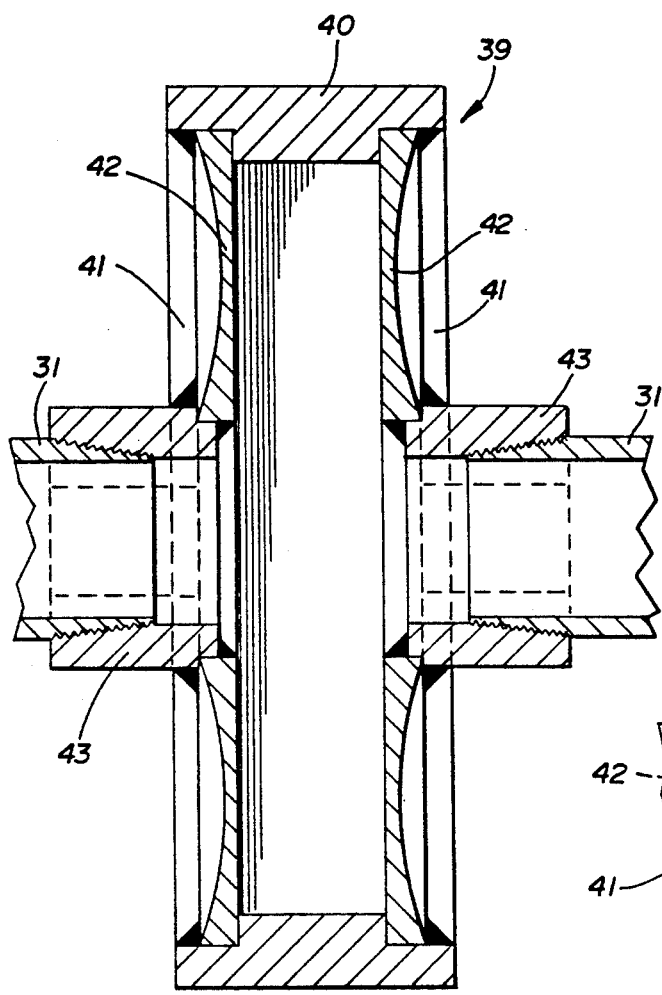
FIG. 8 is an enlarged cross-sectional view of an expansion fitting on the vaporization tubes.
Figure 9:
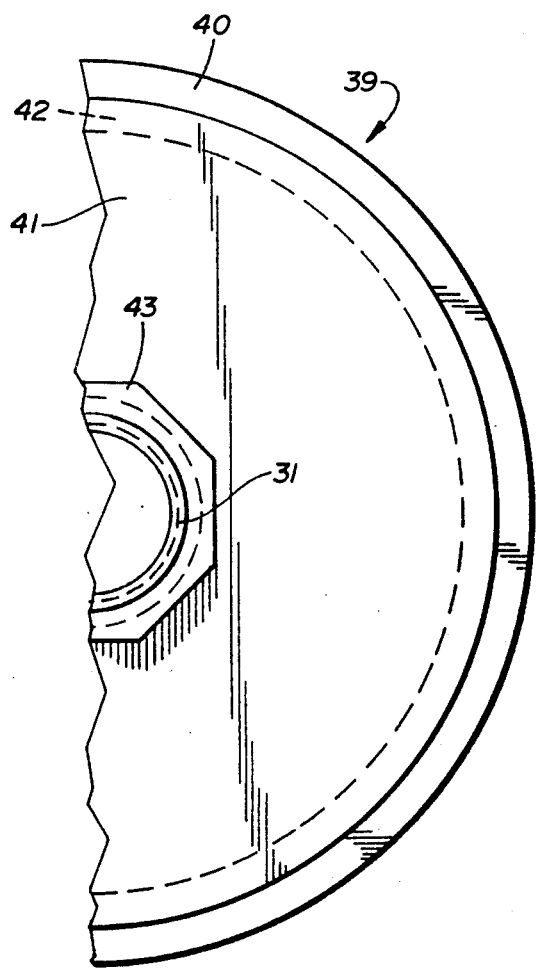
FIG. 9 is an enlarged partial end plan view of the expansion fitting.

Each of the vaporization chambers 11 and 12 have a plurality of horizontally aligned vertically spaced vaporization tube assemblies 31 and 32 extending through multiple apertures in said opposing sidewall pairs 16 and 17, 18 and 19 respectively. Tubes within the vaporization tube assembly 31 each have a water and steam atomizer nozzle assembly 32, best seen in FIGS. 6 and 7 of the drawings comprising a housing 33 defining an atomizer chamber 34 within. A water inlet 35 positioned tangential of said atomizer chamber 34 sprays hot water W supplied via water lines 36 into a supply chamber 34A formed by annular portion 34B having water inlet lines 36 apertured at 34C. A central steam inlet nozzle 37 combines with the water to produce an atomization of the water utilizing the action of the water and steam mixture passing through a secondary nozzle 38 which is in communication with the tubes of the vaporization tube assembly 31. Each of the vaporization tubes has respective expansion joints 39 best seen in FIG. 8 and 9 of the drawing having an annular housing 40 with opposing pairs of closure disks 41 and 42 respectively. Threaded nipple fittings 43 extend from said respective apertured disks 41 and 42 for threaded registration with the respective tubes within the vaporization tube assembly 31. The expansion joints 39 accommodate the expanding gas volume formed from the instantaneous vaporization of the atomized steam/water mix over the length of the vaporization tube assembly 31. Referring to FIGS. 1 and 2 the vaporization tube assembly 32 within the vaporization chamber 12 is shown in dotted lines also has the internally positioned expansion joints 39 as hereinbefore described.

The open vaporization chambers 11 and 12 are filled with molten metal salts MS enveloping the respective heating tube assemblies 24 and 25 and said vaporization tube assemblies 31 and 32. The steam transfer chamber 13 interconnects said vaporization chambers 11 and 12 accepting the low temperature steam output from the vaporization tube assembly 31 through the apertured sidewalls 17 and supplies same as input low temperature steam to the vaporization tube assembly 32 through the respective apertured sidewall 18 in the vaporization chamber 12. The transfer chamber 13 is comprised of opposing walls 44 and 45 and top and bottom closures 46A and B, has a heat exchanger 47 which is positioned on a deflector plate 47A which is arranged for low temperature steam output deflection which in connection with a steam baffle 48 extending vertically from the bottom closure 46B collects condensate for re-circulation as will be described hereinafter.

Water is supplied to the heat exchanger 47 by a supply line 50 and pump 50A with steam generated by the heat exchanger 47 directed to a water storage tank heater 51 within a water tank 51A through respective supply lines 52 maintaining the water tank 51A at 200 degrees Fahrenheit.

The water tank 51A acts as a source of supply for the water steam atomization nozzle assemblies 32 through respective multiple inlet lines 36, pressure regulators 53, pumps 54, filters 55 and associated valves 56.

Figure 3:
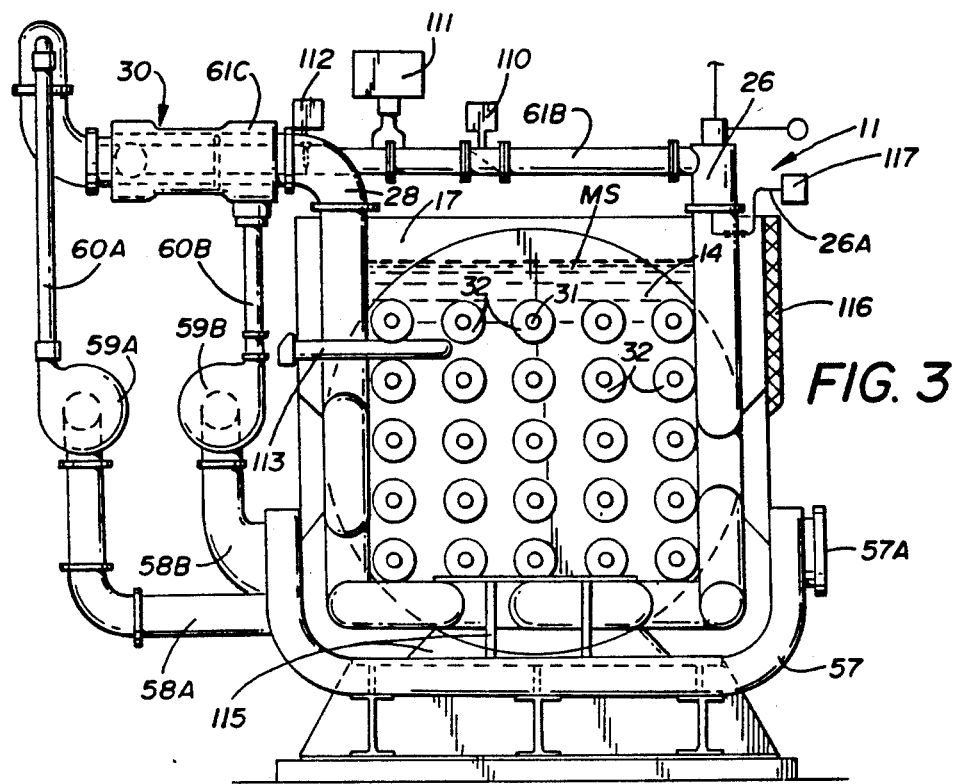
FIG. 3 is a sectional end plan elevation of the steam generator of the invention.
Figure 4:
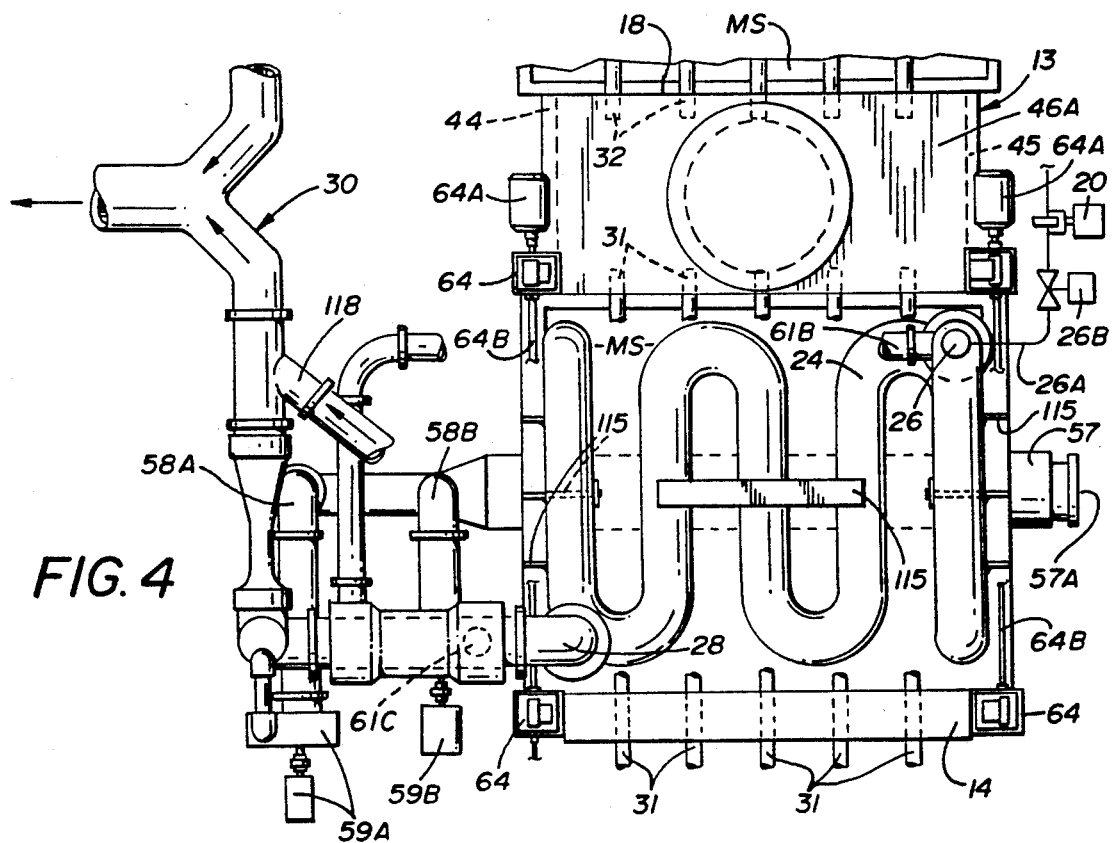
FIG. 4 is a sectional top plan view of the steam generator illustrated in FIG. 3.

Referring now to FIGS. 1, 3 and 4, the molten metal salts MS within the open vaporization chamber 12 is heated to 500 to 600 degrees Fahrenheit by or the enclosed heating tube assembly 25. The respective burner assemblies 26 and 27 have gas supply lines 26A and 27A with associated controlling valves 26B and gas flow transmitters 20. Heated combustion air for the burner assemblies 26 and 27 is supplied from an air heater 57 positioned below and partially within said vaporization chambers 11 and 12. The air heaters 57 have fresh air inlets and filters at 57A and a heat exchanger 57B within the chambers. A pair of outlet air supply ducts 58A and B supply heated fresh air to both the gas burner assemblies 26 and 27 and the vent stack via powered fans 59A and B and respective supply ducts 60A and B. Thermal couplers 113 in said respective vaporization chamber 11 and 12 regulate preset temperature within.

By re-circulating a portion of the burner exhaust gas after dilution with fresh heated make-up combustion air from the air heater 57 to the burner through inlets 61B, the relative by-products of combustion are reduced. Burner control is managed by an air flow valve 110, air flow transmitter 111 and temperature sensor and transmitter 112 within the inlets 61B. Secondary injection of heated fresh air from the air heater 57 through the supply fan 59B after the point of burner re-circulation air at 61 provides a controlled exhaust mixture for the vent stack 30 which is directly connected to the exhaust gas scrubber 30A, best seen in FIG. 10 of the drawings.

The secondary solar heating source for the respective vaporization chambers 11 and 12 can be seen in greater detail in FIGS. 1 and 2, 5 and 5A comprising a pair of identical solar lens assemblies 62 and 63 each of which are positioned above the vaporization chambers 11 and 12 respectively. Each lens assembly is supported by multiple jack pairs 64 that are driven by respective drive motors 64A and threaded shaft 64B extending therefrom, best seen in FIGS. 1 and 2 of the drawings. The lens assemblies 62 and 63 are pivotally connected to the jack pair 64 by pivot points P to allow for selective angular inclination indicated by arrows dependent on the seasonal position of the sun above the horizon. Each lens assembly has a pivoted lens mounting frame 65 interconnected to a sun tracking controller and drive mechanism 66, best seen in FIG. 2. The sun tracking and drive mechanism 66 comprises a motor and gear box assembly 66A with a linkage pivot rod 66B. The sun tracking controller is well known to those skilled in the art and is designed to track the sun across the sky in its east/west path pivoting the lens mounting frame 65 accordingly. A large lens 67 is pivotally positioned within the lens mounting frame on pivot point 67A for converting the sun's energy into a high temperature solar beam within a direction cone 68 that extends into the respective vaporization chambers 11 and 12 as hereinbefore described. A heat exchanger 68A extends around each of the direction cones 68 and is supplied with water from the water supply line 50, returning hot water to the storage tank 51A by return lines 68B.

Figures 5, 5A:
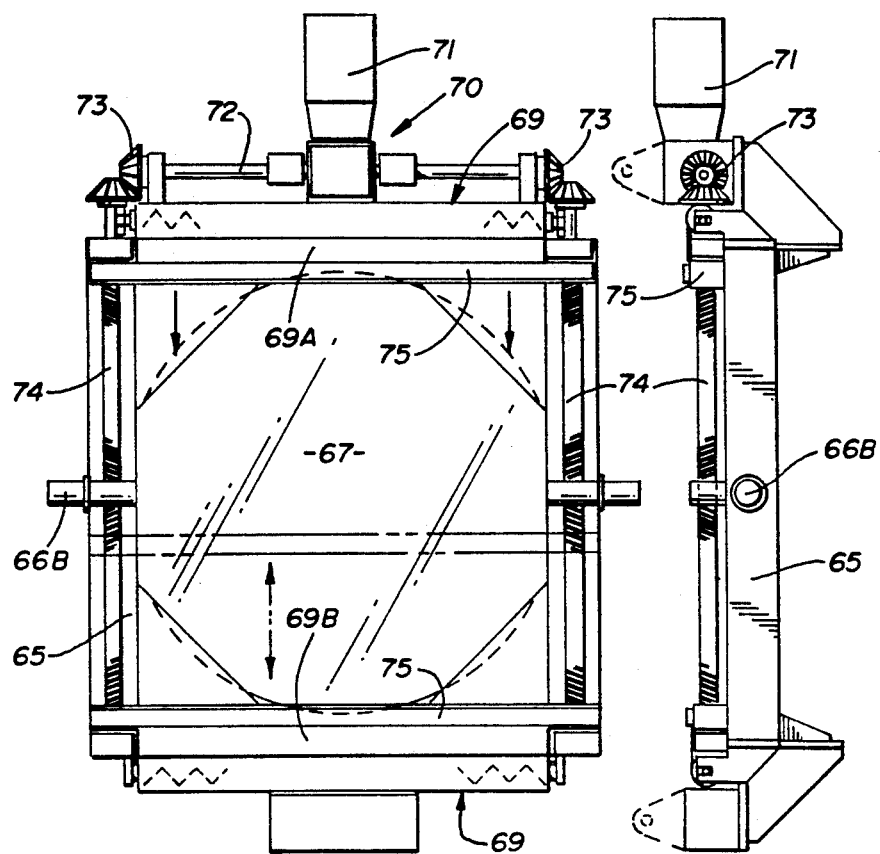
FIG. 5 is a top plan view of a solar lens and tracking assembly of the invention.
FIG. 5A is an end plan view of the solar lens and tracking assembly.

Referring to FIGS. 5 and 5A a pair of shutter blind assemblies 69 are positioned on each of said lens assemblies 62 and 63 above the respective lenses 67. Each shutter blind assembly 69 has a pair of opposing spring-loaded blind rollers 69A with a blind 69B and a blind advancement mechanism 70. The blind advancement mechanism 70 comprises a drive motor and gear box 71, having drive shaft 72 and beveled gear pairs 73 thereon. Drive screws 74 extend respectively from the beveled gear pairs 73, each having a screw follower and blind pull bar 75 positioned therebetween. The screws 74 are right and left hand threaded so that upon activation of the drive motor and gear box 71, the opposing blinds 69B will advance towards one another as indicated in broken lines in FIG. 5.

Figure 10:
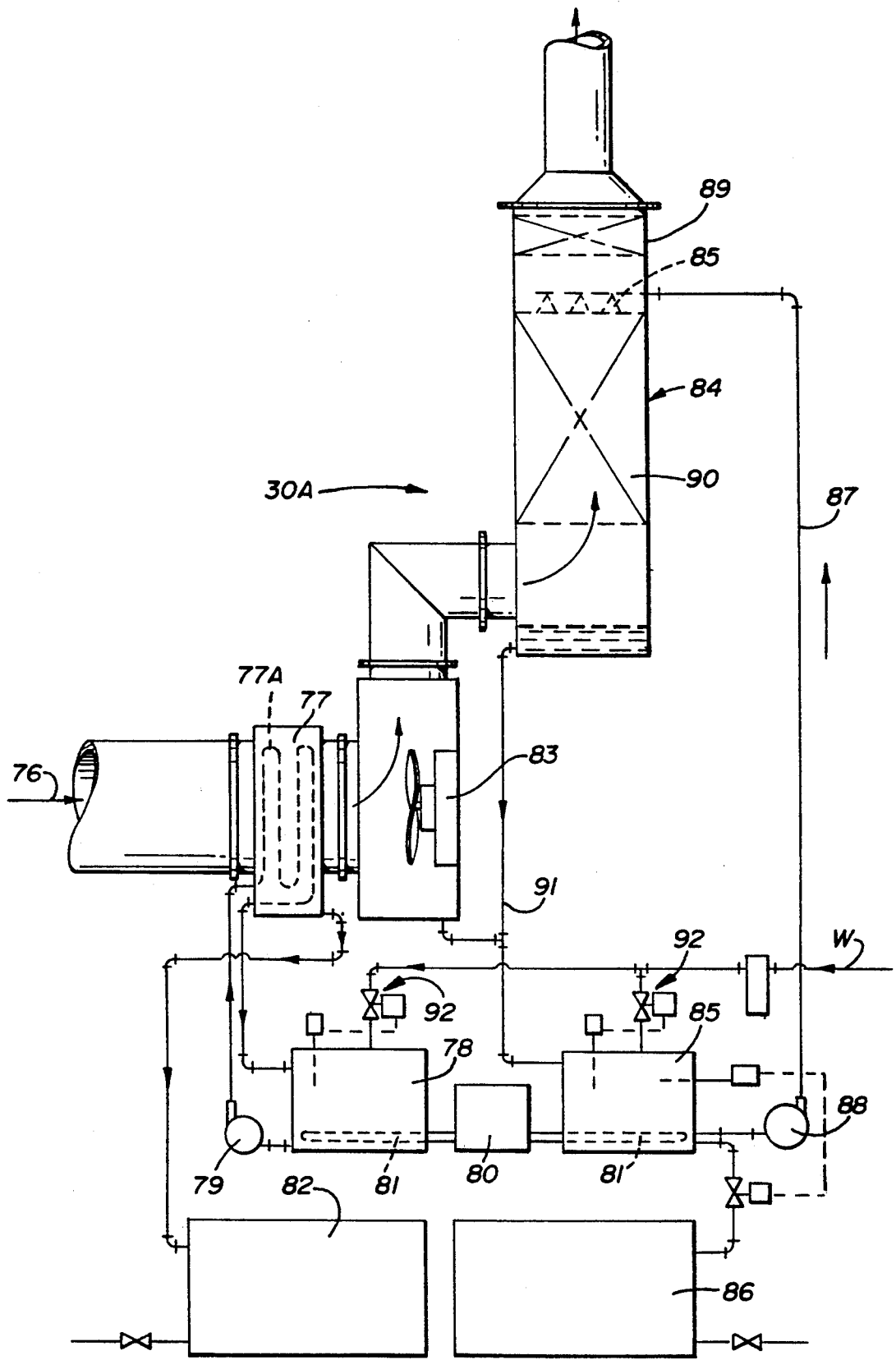
FIG. 10 is a graphic schematic diagram of a exhaust scrubber system for the treatment of products of combustion from the steam generator of the invention.

Referring now to FIG. 10, the exhaust scrubber assembly 30A is graphically illustrated and shows the input of combustion gases 76 to a heat exchanger/-catalytic convertor 77 having coils 77A that use cold water supplied from a storage tank via a pump 79. The storage tank 78 is cooled by a refrigeration unit 80 having coils 81 within. Condensation formed on the coils 77A has a high formaldehyde concentration which is due to the catalytic reaction of the carbon monoxide within the exhaust gases 76 with the copper of the heat exchanger coils 77A and is drained to a holding tank 82. A fan 83 helps draw the exhaust gases 76 over the heat exchanger coils and vents to a scrubber tower 84. A secondary tank 85 supplies conditioned chlorine free water that is treated with potassium dioxide or sodium dioxide to remove 70% to 85% of the $CO_2$ in the exhaust gas by the scrubber tower 84. The conditioned water within the secondary tank 85 is cooled by the refrigeration unit 80 and the submerged coil 81 within. The cold conditioned water (at 32 degrees Fahrenheit) with a $CO_2$ solubility of 33% is sprayed within the scrubber tower 84 by water nozzles 85 therein. The high level of $CO_2$ solubility of the conditioned scrubber water is achieved by the addition of $CO_2$ from a high-free $CO_2$ concentration in a storage tank 86. The spray nozzles are supplied with the conditioned water under pressure through a supply line 87 by a pump 88 as will be well understood by those skilled in the art.

The scrubber tower 84 is known as a "counter current packed wet scrubber" and is available within the art for example from Ceilcote Company, Model No. RPTOS-SPT107 and is a type having a demister area 89 above the spray nozzle 85, and a packing area 90 all of which is well known and understood by those skilled in the art. Used water from the scrubber tower 84 is returned by return water lines 91 and is returned to the secondary storage tank 85.

Subsequent make-up water is supplied to the tanks 78 and 85 by respective metered control valves and engaged assemblies 92 from a water line W.

Referring now to FIGS. 1-4 of the drawings, it will be seen that the solar lens assemblies 62 and 63 supply a concentrated heat generating beam of light within the respective vaporization chambers 11 and 12. The heated molten metal salts MS are maintained thereby at the required temperature (as hereinbefore described). The gas fired heater tube assemblies 24 and 25 provide the primary heat as required.

In operation, heated water is supplied to the water steam atomizer nozzle assembly 32 through the control valve 56, the pressure regulator 53 with associated flow sensors 93 that provide a control with the supply pumps 54.

Saturated steam is supplied to the atomizer nozzle assemblies 32 by steam line 97 having a pressure regulator 95 from a cooling chamber 96 that cools and saturates super heated steam from the vaporization chamber 12. Cooling is achieved by the addition of water by a water supply line 97A.

The atomized water and steam mixture is sprayed into the vaporization tube assemblies 31 within the vaporization chamber 11, filled with the heated molten salts MS at a temperature of 300 to 400 degrees Fahrenheit for flash evaporation within the vaporization tubes. The expansion fittings 39 accommodate the initial volume increase with the steam generated within the vaporization tube assemblies 31 entering the transfer chamber 13 under pressure and impinging on the condensation plate 47A that also supports the heat exchanger 47 hereinbefore described. Condensate formed within the transfer chamber 13 is drained by a steam trap 98 and re-circulated back to the water tank 51A by a return line 100.

The generated steam within the transfer chamber 13 is directed to the secondary vaporization tube assemblies 32 in the vaporization chamber 12 which is heated to 500 to 600 degrees Fahrenheit. The resulting super heated steam exits the vaporization chamber 12 by the output line 102.

Again condensate that may accumulate at this point is drained through a steam trap 103 to the condensate return line 100.

Referring to FIGS. 3 and 4 of the drawings, it will be seen that the respective heating tubes 24 and 25 are suspended within said vaporization chambers 11 and 12 by multiple side and bottom braces 115 and that each of said vaporization chambers 11 and 12 has an insulation layer 116 over their exterior surface to help reduce heat loss. Flame sensors 117 are positioned within respective burner assemblies 26 and 27 to monitor flame condition therein as required. In FIG. 2 molten salt vents 118 can be seen to vent vapors from the respective chambers 11 and 12.

It will thus be seen that a new and useful improvement in a steam generator has been illustrated and described and it will be apparent to those skilled in the art that various changes and modifications may be made therein within departing from the spirit of the invention, therefore I claim:

1. A steam generator wherein super heated steam is produced by heat transfer between a fluid heating medium and the vaporization liquid comprising in combination; a pair of spaced interconnected vaporization chambers, a transfer chamber therebetween, tube bundles positioned within each and extending from said vaporization chambers, said fluid heating medium within said vaporization chamber, means for heating said fluid heating medium including a solar lens configuration and heating tubes, means for supplying said vaporizationable liquid to said vaporization tube bundles for flash of vaporization therein, exhaust re-circulation means for said heating tubes including a power vent stack assembly, an exhaust scrubber in communication with said power vent stack, means for capturing and re-circulating condensate produced from said steam generator, expansion fittings in said vaporization tube bundles within said fluid heating medium, means for atomizing said vaporizationable liquid being injected into said tube bundles, and means for heating said vaporizationable liquid.

2. The combination recited in claim 1 wherein said solar lens configuration comprises, a lens support frame, means for pivoting said frame for solar tracking, means for selective elevation of said frame in angular inclination to said steam generator and means for cooling said solar lens configuration.

3. The combination recited in claim 1 wherein said heating tubes comprises, a compound U-shaped tube member within said vaporization chamber, a burner assembly positioned at one end of said tube member, means for supplying said burner assembly with combustible fuel from a fuel source, and means for supplying said burner assembly with combustion air.

4. The combination recited in claim 1 wherein said means for capturing and re-circulating condensate from said steam generator comprises a deflector plate and steam baffle within said transfer chamber, steam traps in communication with said transfer chamber and said vaporization chamber, and a condensate re-circulation line in communication with said steam traps.

5. The combination recited in claim 1 wherein said expansion fittings in said vaporization tube bundles comprises an annular housing having an inlet and an outlet, and a pair of opposing closure disks secured to said housing.

6. The combination recited in claim 1 wherein said means for atomization of said vaporization liquid before insertion into said tube bundles comprises a nozzle assembly including an atomization chamber, having a water injection nozzle, a steam inlet nozzle and a secondary nozzle in alignment with said steam injection nozzle, said water nozzle in general relation to said steam nozzle and means for interconnecting said nozzle assembly with said tube bundles and a source of steam and water.

7. The combination recited in claim 1 wherein said means for supplying vaporization liquid comprises a water storage tank having supply lines, valves and pumps interconnected therewith, multiple flow sensors and control valves for each of said tube bundles.

8. The combination recited in claim 2 wherein said means for selective elevation of said lens support frame comprises, multiple jack assemblies, means for driving pairs of said jack assemblies to elevate said lens support frame to match a selective solar seasonal angular inclination.

9. The combination recited in claim 2 wherein said means for cooling said lens support assembly comprises a directional cone having a heat exchanger thereon, a source of cooling medium for said heat exchanger, and a flexible connector between said heat exchanger and a re-circulation line to said means for supplying vaporized liquid to said vaporization tube bundles.

10. The combination recited in claim 1 wherein said power vent stack has a combustion air heater adjacent to and within said vaporization chamber, heated air supply ducts extending from said air heater and means for interconnecting said ducts to said vent stack and to said heating tubes.

11. The combination recited in claim 1 wherein said fluid heated medium is molten metal salts.

12. The combination recited in claim 1 wherein said vaporization liquid comprises water.

* * * * *